United States Patent [19]

Parulski

[11] Patent Number: 5,301,244

[45] Date of Patent: Apr. 5, 1994

[54] COMPUTER INPUT SCANNER INCORPORATING MULTIPLE SCANNING MODES

[75] Inventor: Kenneth A. Parulski, Rochester, N.Y.

[73] Assignee: Eastman Kodak Company, Rochester, N.Y.

[21] Appl. No.: 92,661

[22] Filed: Jul. 15, 1993

Related U.S. Application Data

[63] Continuation of Ser. No. 732,253, Jul. 18, 1991, abandoned.

[51] Int. Cl.$^5$ .............................................. G06K 9/22
[52] U.S. Cl. ........................................ 382/59; 382/62; 382/63; 358/453; 358/512; 358/538
[58] Field of Search .................. 382/59, 61, 62, 63; 358/452, 453, 42, 473, 479, 487, 506, 512, 537, 538

[56] References Cited

U.S. PATENT DOCUMENTS

| | | | |
|---|---|---|---|
| 3,873,974 | 3/1975 | Bonton et al. | 340/146.3 AC |
| 3,993,865 | 11/1976 | Browne et al. | 178/7.6 |
| 4,135,212 | 1/1979 | Pugsley et al. | 358/256 |
| 4,396,940 | 8/1983 | Tanaka et al. | 358/80 |
| 4,516,265 | 5/1985 | Kizer et al. | 382/48 |
| 4,538,182 | 8/1985 | Saito et al. | 358/280 |
| 4,581,761 | 4/1986 | Ichinokawa et al. | 382/13 |
| 4,616,926 | 10/1986 | DiPietro et al. | 355/45 |
| 4,750,211 | 6/1988 | Wray | 382/41 |
| 4,819,083 | 4/1989 | Kowai et al. | 358/294 |
| 4,901,364 | 2/1990 | Foulkerson et al. | 382/59 |
| 4,947,261 | 8/1990 | Ishikawa et al. | 358/473 |
| 5,128,777 | 7/1992 | Uno | 358/448 |
| 5,148,294 | 9/1992 | Kurogane et al. | 358/448 |
| 5,162,918 | 11/1992 | Muramatsu | 358/300 |

Primary Examiner—Leo H. Boudreau
Assistant Examiner—Andrew W. Johns
Attorney, Agent, or Firm—David M. Woods

[57] ABSTRACT

A scanner useful as an input device for a computer is operable in two scanning modes: a prescanning mode in which subsampled images are rapidly output to the computer for substantially real-time display, and an input scanning mode in which three successive high resolution color scans are obtained. A fixed image is supported on a movable, hand-manipulated stage that interactively controls the conjugate distances of the optical system so that zooming and cropping is obtained without losing focus. By situating the control buttons for the scanning modes on the movable stage, a single hand can control zooming, cropping, and prescanning without having to interact with a keyboard or like input device to the computer.

16 Claims, 5 Drawing Sheets

COMPUTER INPUT SCANNER INCORPORATING MULTIPLE SCANNING MODES

This is a continuation of application Ser. No. 07/732,253, filed Jul. 18, 1991 now abandoned.

BACKGROUND OF THE INVENTION

1. Field of the Invention

This invention pertains to the field of manually-operated computer input devices, and, in particular, to manually operated film scanner input devices.

2. Background Art

Manual image scanners are well known devices for inputting textual and pictorial information to a computer. U.S. Pat. No. 4,581,761 describes a typical ergonomically-designed housing including a linear sensor that is manually dragged by the hand of a human operator (hereinafter referred to as the "user") across the text or pictorial copy. A pressure sensitive switch on the bottom of the scanner turns the unit on when the user forces the scanner against the copy, and turns the unit off when the depression force is removed. Additional functions, such as variation of the enlargement or reduction ratio, may be engaged by keys on the top surface of the scanner. Notwithstanding such functionality, the scanner operates in but one scanning mode, that is, it inputs scanned data when the bottom switch is depressed and the linear sensor is swept across the copy. (U.S. Pat. No. 4,901,364 shows another example of a scanner capable of multi-functional operation, but only one scan capability.) If playback of the scan is needed, e.g., to evaluate the pictorial information, either the computer has to collect the linear scan data for a complete raster, or, as shown in U.S. Pat. No. 3,993,865, an intermediate store is provided for first collecting data from the manual scanner at a variable rate dependent on hand motion and then repetitively reading out the data at a constant rate for television viewing.

It is sometimes desirable to formulate a preliminary scan of the copy material before the final scan is obtained. For instance, in U.S. Pat. No. 4,516,265, two scanners are employed: a first scanner does a coarse prescan to determine the positional relationship of pattern blocks on the copy (e.g., a postal envelope), and a second scanner does a fine scan on a selected block. In U.S. Pat. No. 3,873,974, the same scanner is used twice, first to perform a rapid initial scan to locate a particular pattern (e.g., white blood cells) and then to perform a rescan to examine a detected pattern in greater detail. Obviously, such dual scanning requires a positionally controlled system if the first scan is to identify parameters that would be useful in the second scan. In the '974 patent, for example, the scanner is part of a microscope stage and not subject to hand-induced variations. In a system capable of some image composition, such as enlargement or reduction as provided in the hand-held scanner described in the aforementioned '761 patent, it would be helpful to visualize what the final scan would look like before it is done. Unfortunately, such hand-operated scanners, where the motion of the hand provides the page scan, do not lend themselves to real-time previewing for composition purposes.

Apart from the realm of hand-manipulated scanners, relatively larger desk-top scanners are available for high resolution scanning of slides or negatives in color or black-and white. An example is the 35 mm Rapid Film Scanner manufactured and sold by Eastman Kodak Company, Rochester, N.Y. This scanner performs a color sequential high resolution area scan (1312×1024 pixel area) of color images in 18 seconds for input to a Macintosh ® computer. Besides performing optical zooming, panning, and cropping, the Rapid Film Scanner has a prescan mode in which the image can be viewed either in monochrome or in color. The user selects the mode via a pull-down menu on the computer. Composing the image in color is difficult, however, because of the slow screen update rate due to the need to sequentially capture three color separations by rotating a filter wheel, and due to the color fringes which appear if the film image is moved while the separations are scanned. As a result, image composition is normally done in the monochrome mode. To then capture the image in color, the user must redirect attention to the computer, pull down the computer menu, and select the color mode. Once the color image is captured, the user must pull down the menu again, in order to return to the monochrome mode, and compose the next image. This means that the user must continuously switch from handling the scanner to handling the computer pointer, typically by manipulating a mouse. This is a tolerable situation for user scanning of only a few images, as is typically the case in applications where such a scanner is used. It is less acceptable in the case where real-time interactive image input is desired.

User-friendly zoom and crop features are compromised if the user must continually divert attention back and forth between the scanner and the computer pointer or keyboard for every image to be scanned. There is a need, consequently, for a manually operated film scanner allowing a fully-operational tactile engagement of the scanner (that is, operation of the scanner in all its modes) while providing a virtually simultaneous display of the image on the computer to which the scanner is connected.

SUMMARY OF THE INVENTION

An object of the invention is to provide a continuous, automatic mode in a small, hand-manipulated film scanner that scans images into a host computer so that the user can properly compose the image on the host computer's display screen.

Another object of the invention is to allow the user to rapidly input images into a computer by interacting only with the hand-manipulated film scanner, specifically not requiring interactions through the computer keyboard or cursor-driven menu selections on a display screen.

Another object of the invention is to provide a hand-manipulated film scanner operable in two modes, one for prescanning images into the host computer for image composition, and the other for capturing the finally composed image in high resolution and/or in color.

A user-manipulated scanner according to the invention includes sensing means for providing an image signal from a fixed image, optical means for directing image light along a light path toward the sensor, and means for varying the portion of the fixed image scanned by the sensor to obtain the effect of zooming or cropping. The scanner is selectively operable in two modes: a prescan mode in which the fixed image is rapidly scanned into a computer for substantially real-time display, and a high resolution input scan mode in which the fixed image is scanned for input to the computer. The respective modes are engaged by hand activated means on the scanner for initiating the prescan mode prior to the high resolution input scan mode. In the preferred scanner, the fixed image is a film transparency.

BRIEF DESCRIPTION OF THE DRAWINGS

The invention will be described in relation to the drawings, in which.

DESCRIPTION OF THE PREFERRED EMBODIMENT

Figure 1:
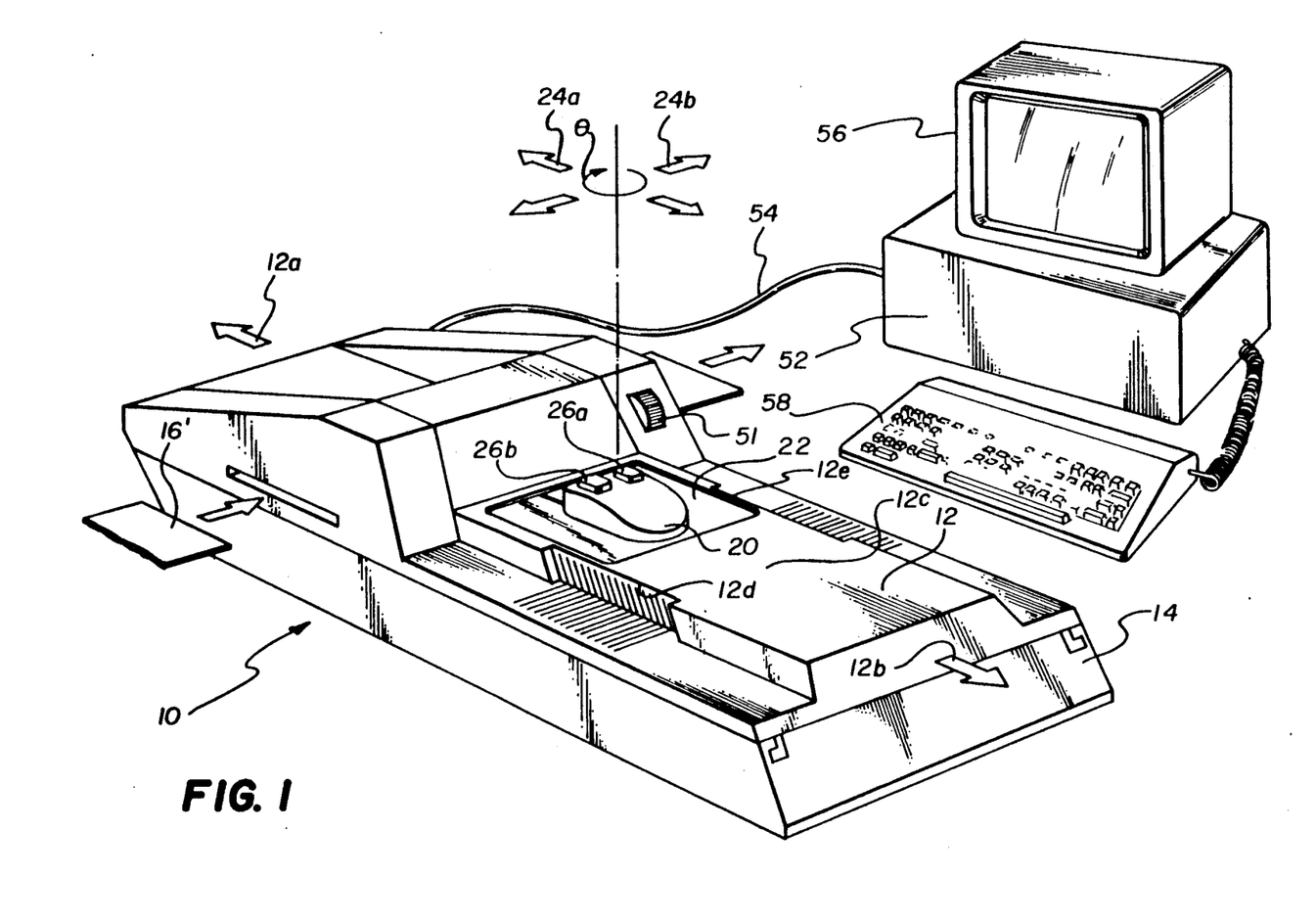
FIG. 1 is a pictorial view of a film scanner, shown in accordance with the invention, that is connected to a host computer.

Referring initially to FIGS. 1 through 5, a computer-input film scanner 10 is shown according to the invention, including an image composition stage 12 constrained to move relative to a housing 14 in the opposed directions depicted by arrows 12a and 12b in FIG. 1. Movement as depicted effects, as will be shown, a zooming operation. The stage 12 and the housing 14 together enclose an optical system (FIGS. 2–5) for scanning a film image 16 on a filmstrip 16', which is internally supported in the optical system on a film carriage 18 (best shown in FIG. 4). The film carriage 18 is interconnected with a hand-manipulated controller 20 that is movable within limits defined by a sunken space 22 on the stage 12. An area under the controller 20 (not shown) is removed to permit interconnection through a lever arrangement 21 (FIG. 4) between the controller 20 and the film carriage 18. Hand-initiated movements of the controller 20 thereby provide x-y translation of the film carriage 18, and the film 16 therewith, as depicted by the arrows 24a, 24b in FIG. 1 (centered over the controller). The lever arrangement 21 can also permit rotary movement of the film carriage 18 by similar rotation of the controller 20 in a Θ direction. The controller 20 includes at least one button or switch 26a, 26b for initiating scan-related functions, such as prescan, as will subsequently be described.

Figure 2:
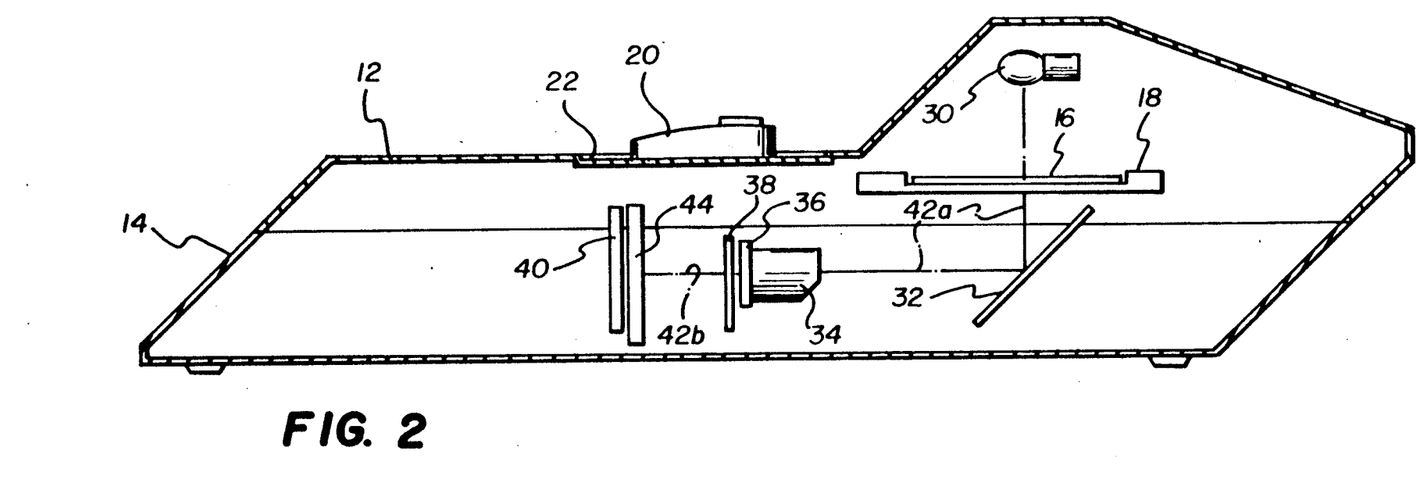
FIG. 2 is a side elevation of the scanner shown in FIG. 1, as simplified to show the main components of the optical system.

FIG. 2 shows the elements of the optical system enclosed by the stage 12 and the housing 14, including an illumination source 30, a mirror 32, a fixed focal length lens 34, an electrically-operated mechanical shutter 36, a color filter wheel 38 and an image sensor 40. The mechanical cooperation between the stage 12 and the housing 14 controls the relative position of the optical components. A preferred mechanism for controlling the position of the optical components is disclosed in copending U.S. Ser. No. 659,336, filed on Mar. 7, 1991, entitled "Device for Converting Light Signals into Video Signal", and assigned to the same assignee as the present invention. Ser. No. 659,336 describes a device in which a lens unit, a sensor, and an object are all supported on separate carriages, any two of which are movable with respect to the others along the optical axis of the device. The positions of the movable elements determine the image and object distances for the imaging of a section of the object on the sensor. The two adjustable elements are connected by a cam mechanism such that, when the image and object distances are adjusted by the cam mechanism, the lens images the zoomed section of the object sharply on the sensor. The cam mechanism described in Ser. No. 659,336 is also incorporated in the aforementioned 35 mm Rapid Film Scanner.

In operation, the optical path positions of the conjugate planes in which the film image 16 (object) and the image sensor 40 (image) of the scanner 10 are located are varied in a complementary manner such that the image distance and the object distance are always in compliance with the lens law ((l/focal distance = (l/image distance + (l/object distance)). More specifically, the mirror 32 is fixed to the stage 12 (see FIG. 4), and moves therewith, while the lens 34 is fixed to the housing 14. Movement of the stage 12 therefore varies the length of the optical path 42a (object distance) between the film 16 and the lens 34. The sensor 40, as will be shown, is mounted on a carriage 44 (see FIG. 5) that is movably interconnected to the stage 12 so that movement of the stage 12 also varies the length of the optical path 42b (image distance) between the lens 34 and the sensor 40. The shape of the cam 47 maintains the lengths of the optical paths 42a, 42b in accordance with the lens law. Thus, the positions of the film 16 and the enclosed image sensor 40 are maintained in their proper conjugate planes with respect to the lens 34 in order to zoom and crop an image of the film 16 without losing focus.

Figure 3:
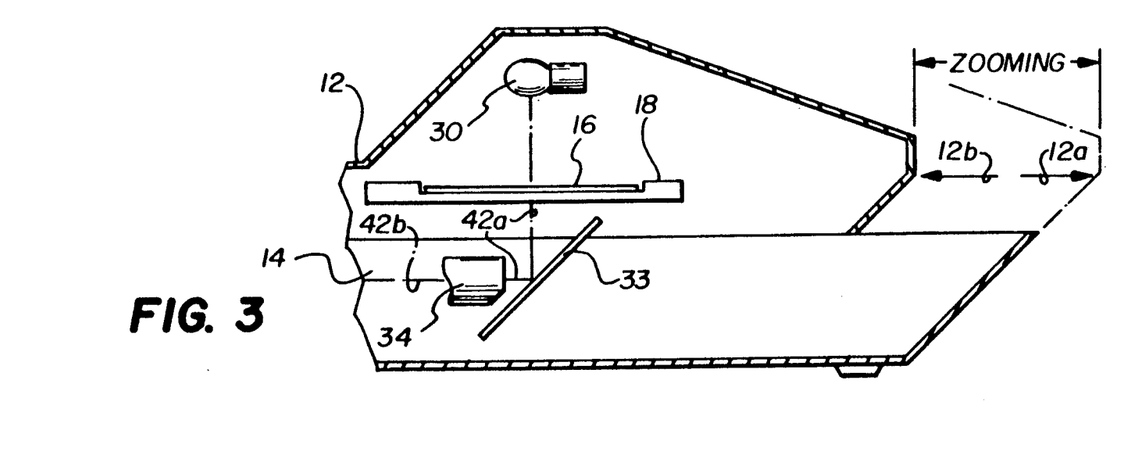
FIG. 3 is a partial side elevation of the scanner shown in FIG. 1 further simplified to show zooming movement.
Figure 4:
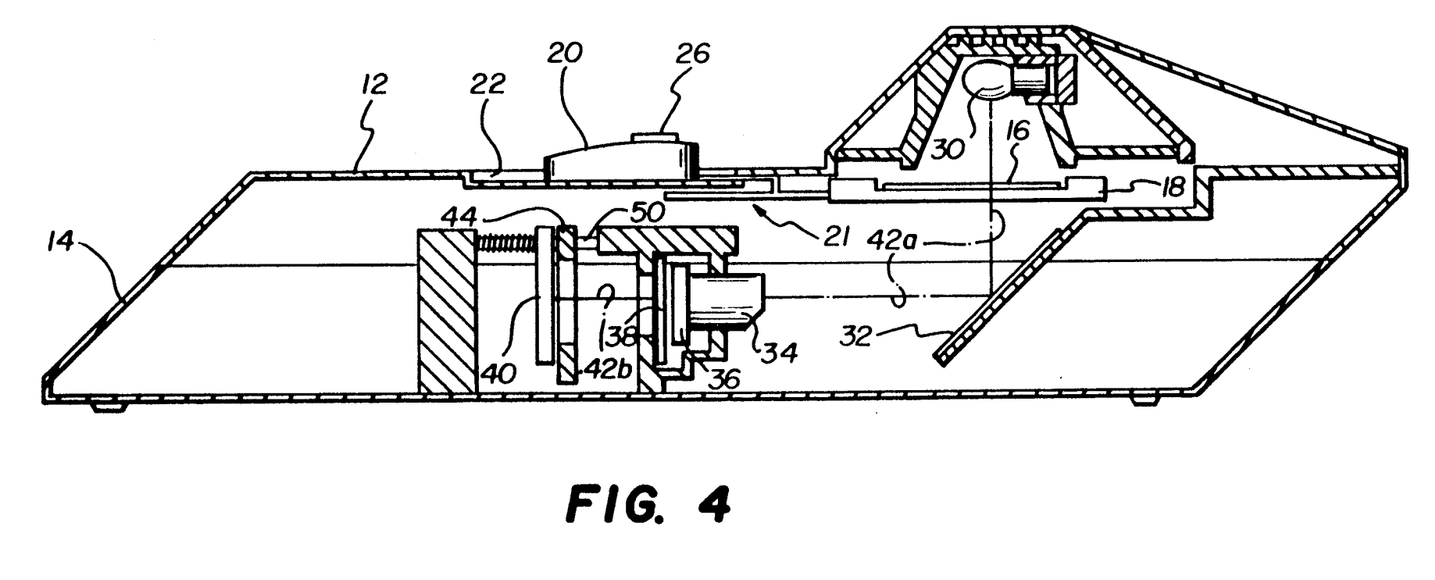
FIG. 4 is a detailed side elevation of the scanner shown in FIG. 1.
Figure 5:
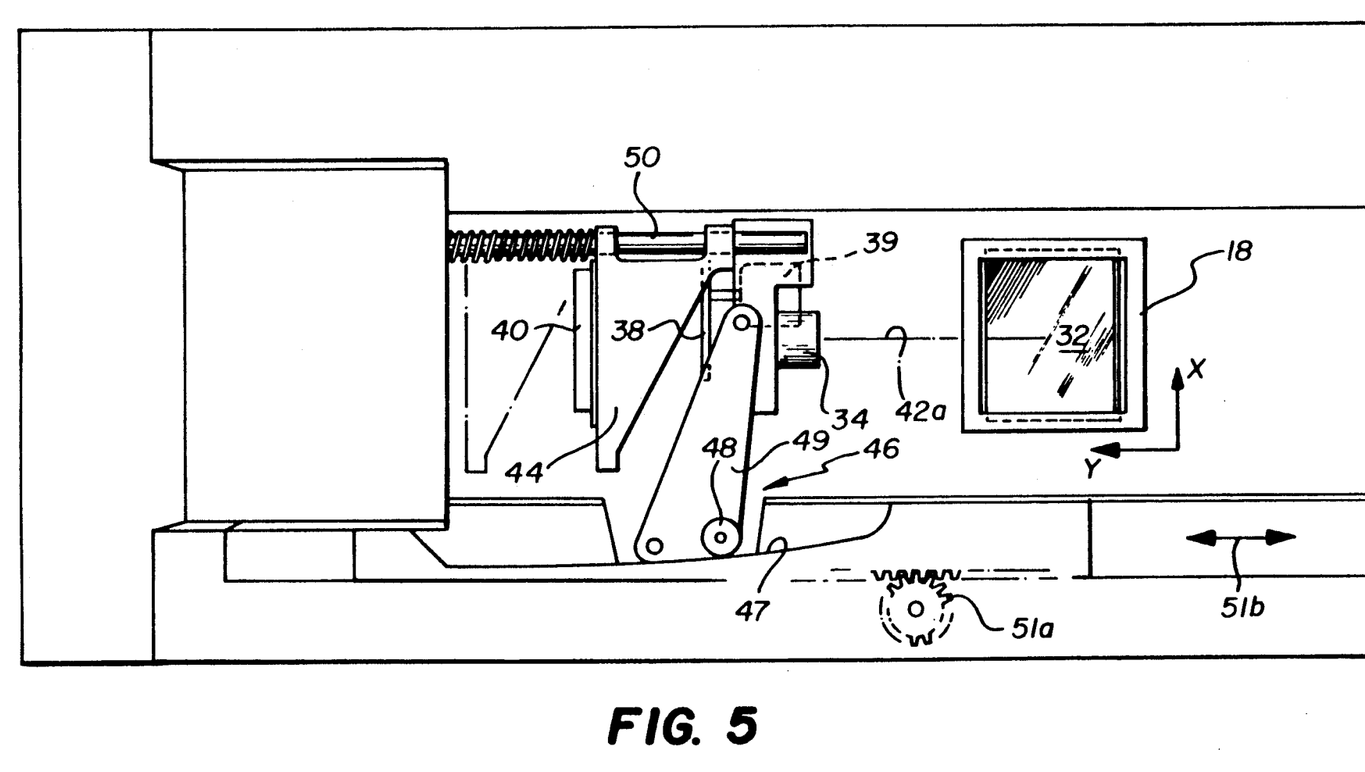
FIG. 5 is a top view of the scanner shown in FIG. 1.

The relationship between the positions of the sensor 40 and the film carriage 18, as taught by Ser. No. 659,336, is provided in the scanner 10 by a zoom-cam mechanism 46, generally shown in FIG. 5 by a cam surface 47 attached to the stage 12 and a cam follower 48 connected by a bracket 49 for moving the sensor carriage 44 with respect to the lens 34 along a spring loaded cylindrical mounting beam 50 which is attached to the housing 14. Movement of the stage 12 in the directions 12a or 12b (FIG. 1) therefore initiates changes in the optical path components 42a and 42b so that focus is maintained while zooming the image. Initial focus is obtained by adjusting a thumb wheel 51 (FIG. 1), which is connected by gearing (not shown) to a pinion 51a (FIG. 5) for racking the cam 47 back and forth in accordance with the arrow 51b until initial focus is obtained. Thereafter the zoom-cam mechanism 46 maintains focus. The maximum extent of movement of the stage 12 relative to the housing 14 in the course of achieving such zooming is shown in FIG. 3. In addition to zooming, the image may be cropped in x-y directions 24a and 24b (FIG. 1) by moving the controller 20 within the sunken space 22 on the surface of the sled 12, and the image may be rotated in a Θ direction by rotating the controller 20. The relative movements of the stage 12 and the controller 20 are provided from one hand by resting the palm on the area 12c of the stage 12 and draping the thumb and little finger over the edge 12d and 12e while the middle fingers rest over the controller 20. In this manner, pressure from the whole hand moves the stage 12 while the middle fingers independently move the controller 20.

Referring particularly to FIG. 1, the output of the scanner 10 is digitized and fed to a host computer 52 via a digital interface such as a SCSI interface 54. A display screen 56 and a keyboard 58 are connected to the computer 52. The film scanner 10 is operable in two modes, according to the invention, as a computer input scanner device for prescanning an image, typically to determine the desired composition, and for input scanning the finally-composed image. The two modes are distinguished by some characteristic that permits the prescan to be rapid enough for substantially real-time display. For instance, the prescan may produce a subsampled monochrome image, while the input scan produces a full resolution monochrome image. The prescan may be only one color record (e.g., green) while the input scan includes all three colors (e.g., red, green, and blue). In the prescan mode according to the described embodiment, the scanner 10 continuously outputs a spatially-subsampled version of the green record, which is displayed on the computer screen 56 as a monochrome image. In the input scan mode, the scanner 10 inputs first the green, then the red, and finally the blue color separations, and then stops sending data. The prescan mode is initiated by depressing the button 26a. The input scan mode is then initiated by depressing the button 26b, or, alternatively, by simply relieving pressure on the button 26a (in which case, the button 26b is omitted). The controller 20 can also be constructed with the switch 26a on its bottom, so that pressing the controller against the stage 12 closes the switch 26a and initiates the prescan mode. Releasing pressure on the controller 20 would then automatically initiate the input scan mode.

Figure 6:
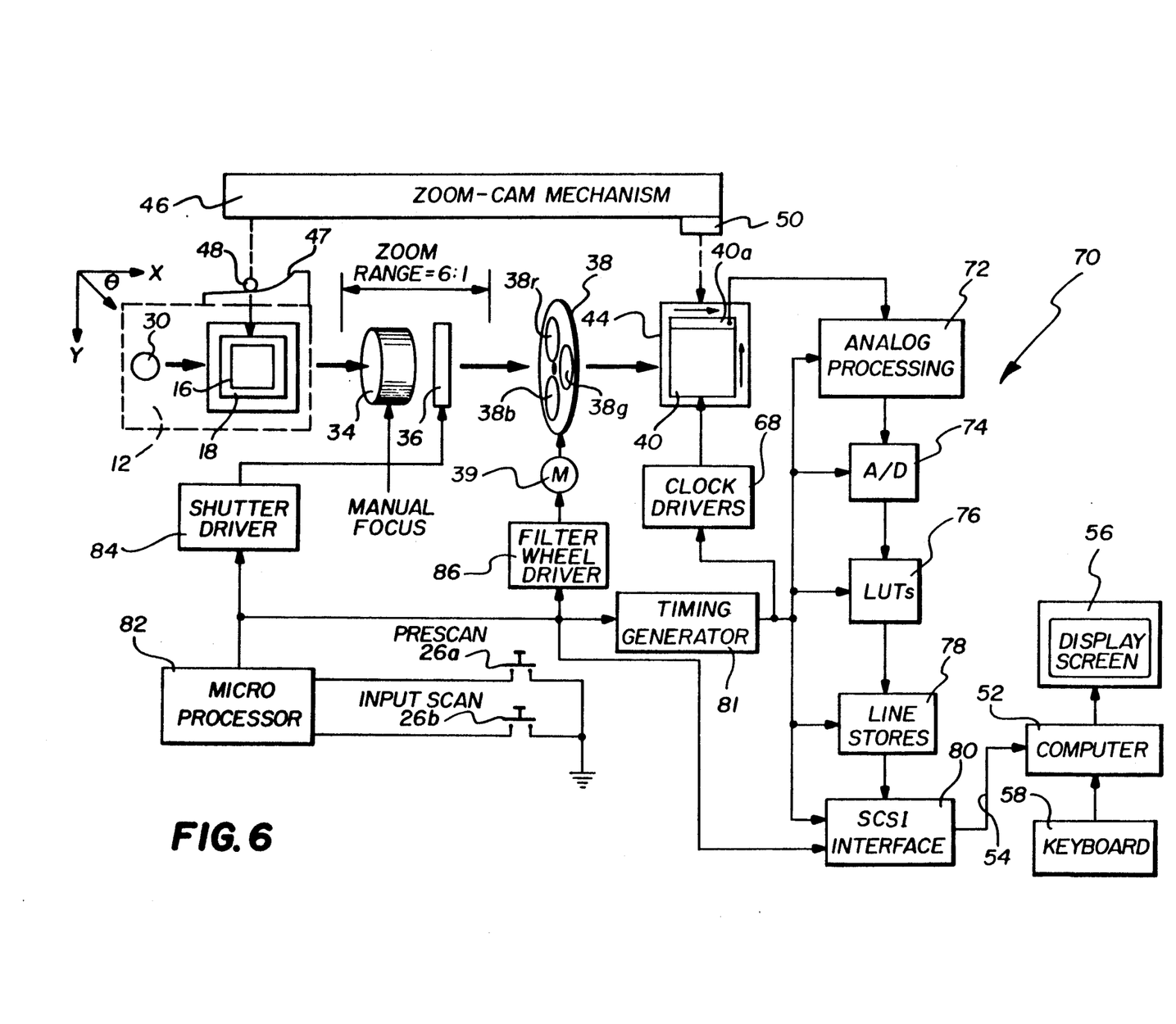
FIG. 6 is a block diagram mainly showing mechanical and electrical components of the film scanner shown in FIG. 1.

Further detail of the scanner 10 circuitry is shown in FIG. 6 in relation to components already described. The optical section of the scanner includes the aforementioned light source 30, the movable stage 12 for supporting the film 16 in the optical paths 42a and 42b, the mechanical shutter 36, the lens 34, the color filter wheel 38 and the full frame image sensor 40 supported in the mounting bracket 44. In accordance with the disclosure of Ser. No. 659,336, the stage 12 includes the cam 47 of the zoom-cam mechanism 46, which in turn is coupled by the cam follower 48 to the mounting bracket 44 of the sensor 40 to maintain proper focus. The lens 34 itself is maintained in a fixed position relative to the housing 14. Thus the movable stage 12 changes the (object) distance between the film 16 and the lens 34, thus changing the magnification while the zoom cam mechanism 46 accordingly changes the (image) distance between the sensor 40 and the lens 34 thus maintaining proper conjugate planes for proper focus at the different magnifications.

For color scanning, the scanner 10 utilizes a color sequential exposure through three color filters 38r, 38g, and 38b mounted on the color filter wheel 38. For this purpose, a motor 39 (see FIG. 5) drives the color filter wheel 38 so as to place each color filter 38r, 38g, and 38b in the optical path. The film image is focused by the lens 34 through each color filter sequentially, onto the sensor 40, which effectively acts as a sequential monochrome sensor. By rotating the color filter wheel 38 so that the three filters 38r, 38g, 38b are sequentially interposed in the optical path 42a, 42b, a sequence of three color exposures are made upon the sensor 40. The exposure time in each color is regulated by opening and closing the shutter 36 for each exposure. Signals generated by clock drivers 68 drive the image charge line by line to a horizontal register 40a and therefrom to a signal processing section 70.

The signal processing section 70 includes an analog processing circuit 72, an analog-to-digital (A/D) converter 74, a set of look-up tables (LUTs) 76, a set of line stores 78, and a SCSI interface circuit 80. The analog processing circuit 72 provides pre-amplification and conventional correlated double sampling of the analog signals. The analog signals are converted into digital image signals by the A/D converter 74 and applied to the LUTs 76, which contain values to allow for user adjustment of the tone scale (contrast and gamma). The line stores 78 allow buffering of at least one line of data, so that line scanning of the image sensor 40 may be asynchronous with respect to the output of the scanner 10 to the computer 52. The processed signal is then connected via a conventional SCSI digital interface 80 to the computer 52. Timing signals from a timing generator 81 control the processing throughput rate of the signal processing circuit 70, as well as the timing of the clock driver 68.

The film scanner 10 functions as an interactive computer peripheral input device for converting a color film image into a digital image. Furthermore, it is an intelligent peripheral device incorporating a microprocessor 82 that is capable of internal, low-level operations, such as exposure sequencing. For this purpose, the microprocessor 82 controls the shutter 36 via a shutter driver 84, and the color wheel motor 39 via a filter wheel driver 86. However, it ultimately depends upon the computer 52 to provide high level operator interface, display, high level control and image data capture functions.

According to the invention, the microprocessor 82 enables operation of the scanner 10 in the two principal modes: the prescan mode for rapidly scanning images to the computer 52 without requiring user interaction with the computer keyboard 58 and/or a cursor/pointer on the display 56, and the input scan mode, which is ordinarily much slower than the prescan mode. In order to implement two modes with different scan rates, the scanner is capable of digitizing the film at multiple spatial resolutions, based on the spatial resolution of the sensor 40. A preferred sensor is Kodak Model KAF-0320, which has 512 lines of 768 pixels each. In a scanner using a SCSI interface, such a sensor is capable of producing 512–768 pixel color image data (three image separations) in approximately 10 seconds, or 512×768 pixel monochrome image data (a single image) in approximately 3 seconds. An update rate of 10 seconds, or even 3 seconds, is too long to provide proper visual feedback to the user to allow the user to easily compose the image by moving controller 20 and stage 12. Therefore, resolution in the prescan mode is reduced by spatial subsampling to 128×192 pixel monochrome image data (one image separation), which allows the scan time to be reduced to less than 200 milliseconds. Prescanning is initiated by depressing the button 26a. The output image to the display 56 can then be updated approximately 5 times per second, so that it appears to the user to be a substantially real-time zoom and crop display. Once the user has composed the image, the button 26b is depressed and the full resolution (512×768 pixels) color image is scanned in three successive scans (10 seconds) and input to the computer 52 for storage and/or processing, as desired. Accordingly, the prescan is obtained at a lowered resolution sufficient for composition (and at a much faster rate) while the final, input scan utilizes the full resolution of the image sensor.

The lowered spatial resolution for the prescan mode is accomplished in the vertical direction by clocking several lines, e.g., four lines, out of the sensor 40 for every line read out of the horizontal register 40a, thereby summing the several lines in the horizontal register. Horizontal subsampling is accomplished by running the horizontal clock provided by the clock driver 68 for the horizontal register 40a at some integral multiple, e.g., four times the frequency, of the clock driving the A/D converter 74. Thus a fewer number of samples are generated for each line and subsampling is accordingly effected. To provide the same signal level to A/D 74 in the prescan mode, the exposure time of the shutter 36 must be decreased (e.g., ¼) to compensate for the increased signal due to vertical charge summing.

FIG. 6 shows one way of indicating the desired mode to the microprocessor 82, that is, by actuation of a simple prescan switch (button) 26a and a similarly simple input scan switch (button) 26b. These switches are mounted on the scanner in a place accessible to a single hand of the user (such as the switch positions 26a and 26b on the controller 20), and in particular where they may be actuated without having to resort to the keyboard 58 or to a cursor device on the display screen 56. Preferably, the switches 26a and 26b are accessible to the same hand that operates the zoom cam mechanism 46. Instead of using mechanical switches 26a and 26b, capacitive-type sensors may be used, which change state depending on whether or not the user's hand is located nearby. As a further alternative, a motion-type detector can be used, which indicates whether the zoom-cam mechanism 46, or the stage 12, has been moved to a new position. Prescanning would thus continue as long as motion continued, and cease a timed period after motion ceased. Moreover, the prescan and input scan buttons 26a and 26b can be combined as one button, with the initial depression initiating the prescan mode, which would continue until the button is released. At that point the input scan is initiated.

The full frame sensor 40 and the shutter 36 are used in combination so that long sensor exposure times and the required sensor readout times will not cause a significant increase in noise. Because the shutter 36 must be opened and closed each time an image is captured, it is desirable to minimize the number of times the shutter 36 is activated when scanning the image, particularly in the prescan mode, in order not to wear out the shutter. The shutter 36 must be continually activated when the user is actively composing the image, of course, so that the computer screen 56 displays the updated image as the user "zooms and crops" to compose the image. The screen 56 is updated approximately 5 times per second (300 shutter actuations per minute), so that it appears to the user to be a real-time zoom and crop display. Once the user has completed the composition, however, the RGB color image can be scanned and input using 3 shutter actuations, and the shutter 36 does not need to be opened again until the next image need to be pre-scanned. The microprocessor 82 is thus programmed to prolong the shutter 36 life by "firing" the shutter only when necessary.

The invention has been described in detail with particular reference to preferred embodiments thereof, but it will be understood that variations and modifications can be effected within the spirit and the scope of the invention.

I claim:

1. A user-manipulated scanner useful as a high resolution input device for a computer, the scanner comprising sensing means for providing an image signal from a fixed image to a display device connected to the computer, said sensing means including a solid state image sensor having a two-dimensional array of picture elements, optical means for directing image light along a light path toward the sensor, and varying means for varying the portion of the fixed image scanned by the sensor in order to compose an image shown on the display device, said scanner being selectively operable in two modes, including a prescan mode in which said varying means is operated by the user to select a portion of the fixed image and in which said portion of the fixed image is rapidly and repeatedly scanned into the computer for substantially real time display of said image signal while operating said means for varying the portion of the fixed image scanned by the sensor, and a high resolution input scan mode in which said portion of the fixed image is scanned for input to the computer, said scanner including hand-activated means for initiating the prescan mode prior to the high resolution scan mode.

2. A scanner as claimed in claim 1 wherein said sensing means further includes a plurality of color filters sequentially insertable into the optical path to the sensor to produce a like sequence of color image signals when operating in the high resolution input scan mode.

3. A scanner as claimed in claim 1 wherein said varying means includes means for varying the position of the scanned image and wherein said varying means and said hand-activated means for initiating the prescan mode are together located on the scanner in a location commonly accessible to a hand of the user.

4. A scanner as claimed in claim 3 wherein said varying means is activated from a hand-movable stage and said hand-activated means for initiating the prescan mode is located on said hand-movable stage.

5. A scanner as claimed in claim 1 wherein the scanner is operable in the prescan mode to produce a low resolution monochrome image.

6. A scanner as claimed in claim 5 wherein said sensing means produces red, green, and blue scans of the fixed image, and wherein the monochrome image produced in the prescan mode is the green scan.

7. A scanner as claimed in claim 1 wherein the fixed image is a film transparency.

8. A manually-operated scanner suitable for one-handed operation and useful as an input device for scanning a fixed image into a computer, said scanner comprising:
   an image sensor having a two-dimensional array of picture elements;
   gate means for supporting a fixed image;
   an optical system defining an optical path for imaging the fixed image upon said sensor;
   manual hand-operated means for selecting the portion of said fixed image scanned by said sensor;
   means for imaging a selected portion of the fixed image upon the sensor;
   a plurality of color filters interposed in the optical path between said gate means and said image sensor;
   control means for operating the scanner in either of two modes, including a prescan mode in which said portion of the fixed image is imaged through a single color filter interposed in the light path and an image signal is repetitively read from the sensor while said manual hand-operated means for selecting the portion of said fixed image scanned by said sensor is concurrently operated and an input scan mode in which the plurality of filters are sequentially interposed into the light path and a color sequential image is read from the sensor.

9. A scanner as claimed in claim 8 in which said plurality of color filters are red, green, and blue filters, and said single color filter interposed in the prescan mode is the green filter.

10. A scanner as claimed in claim 8 in which the scanner further includes means operative in the prescan mode for subsampling the image signal read from the image sensor.

11. A scanner as claimed in claim 10 in which said subsampling means obtains a subsampled signal by vertical charge summing of the image signal generated by said image sensor.

12. A scanner as claimed in claim 11 in which said optical system includes a shutter for regulating the exposure time.

13. A scanner as claimed in claim 12 in which said exposure time is decreased during the prescan mode to compensate for increased signal due to vertical charge summing.

14. A manually-operated film scanner suitable for one-handed operation and useful as an input device for scanning a film image into a computer, the scanner comprising an optical system defining an optical path, an image sensing means located in the optical path and including a two-dimensional image sensing array, a gate from supporting the film in the optical path, means for adjusting the optical system to dispose different portions of the film image upon the image sensing means thereby providing the effect of zooming and/or cropping the image scanned into the computer;

means for operating the scanner in either of two modes, including a prescan mode in which partial resolution renditions of a selected portion of the image are repeatedly taken from the image sensing means while manually operating said means for adjusting the optical system, and an input scan mode in which a full resolution rendition of said selected portion of the image is taken from the image sensing means; and a manually-operated scanning stage from which said adjusting means and said mode operating means can be actuated in substantial simultaneity by a single hand.

15. A scanner as claimed in claim 14 in which said image sensing means is operable to produce a color image, and wherein said operating means includes operation in a prescan mode in which the partial resolution image is a monochrome image and in an input scan mode in which the full resolution image is a color image.

16. A scanner as claimed in claim 15 in which said optical system includes a plurality of color filters sequentially inserted into the optical path to produce a color sequential signal from said image sensing means, and wherein said operating means includes operation in a prescan mode in which the monochrome image is a green image and in an input scan mode in which the color image is a sequence of red, green, and blue images.

* * * * *